United States Patent
Bidiville et al.

(12) 
(10) Patent No.: US 6,400,356 B1
(45) Date of Patent: Jun. 4, 2002

(54) MOUSE WITH ROLLER ATTACHED TO BUTTON

(75) Inventors: Marc A. Bidiville, Pully; Antoine Merminod, Cully, both of (CH)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/408,089

(22) Filed: Sep. 29, 1999

(51) Int. Cl.[7] .................................................. G09G 5/08
(52) U.S. Cl. ....................................................... 345/163
(58) Field of Search ........................... 341/20; 345/163, 345/166, 167

(56) References Cited

U.S. PATENT DOCUMENTS 5,530,455 A * 6/1996 Gillick et al. ............... 345/163
5,808,568 A * 9/1998 Wu ............................. 341/20
5,828,364 A * 10/1998 Siddiqui ...................... 345/163
5,912,661 A * 6/1999 Siddiqui ...................... 345/166

* cited by examiner

*Primary Examiner*—Steven Saras
*Assistant Examiner*—Uchendu O. Anyaso
(74) *Attorney, Agent, or Firm*—Townsend and Townsend and Crew LLP

(57) ABSTRACT

A simplified, inexpensive roller for a mouse, trackball or other input device. The support for the roller is attached to the bottom of a button. In one embodiment, the roller is fixed with respect to the button so that when the roller is depressed, the button depresses to cause a switch activation. This is in contrast to prior art devices where the roller itself would depress into the housing. Here, the housing (button) depresses with the roller. This greatly simplifies the design.

20 Claims, 3 Drawing Sheets

MOUSE WITH ROLLER ATTACHED TO BUTTON

BACKGROUND OF THE INVENTION

The present invention relates to computer mice or track balls, and in particular to those including a roller.

In one type of computer mouse, a ball protrudes from the bottom of the mouse housing, and rolls across a supporting surface. The movement of the ball is typically detected by shafts which are in contact with the ball and turn an encoder wheel having a number of slots. An LED is on one side of the encoder wheel, and a detector on the other, so that the turning of a encoder wheel, corresponding to the movement of the ball in one direction, can be detected by the intensity of light when it shines through a slot, and is subsequently blocked between slots. Track balls will have a ball mounted on the top with the housing being stationary, but similarly operate with two encoder wheels at 90° angles to detect X and Y movement. Optical mice and trackballs have also been developed.

Such mice and track balls typically also have buttons which can be depressed or clicked by a user, and which depress a switch (microswitch, pancake, optical, etc.). These provide additional inputs to the computer, in addition to the position of the mouse or trackball. Some mouse designs have added a roller or wheel which can be used for such functions as scrolling or zooming. The roller is operated by a user finger much like a dial on a radio.

One roller design is shown in U.S. Pat. No. 5,298,919 assigned to Multipoint Technology Corporation. This has a user operable roller which has a shaft extending out from it, and an encoder wheel attached to the shaft. The encoder wheel is like the optical encoders used on the mice or trackball balls. Microsoft U.S. Pat. No. 5,473,344 shows a design similar to the Multipoint one in which a shaft from the roller is connected to a separate optical encoder wheel. One Microsoft product has a shaft supporting the roller and encoder wheel, with the shaft being itself mounted on forks extending up from the lower housing of the mouse through openings in a circuit board.

Another design is shown in U.S. Pat. No. 5,313,230 assigned to Apple Computer. This shows two finger rollers with a shaft which drives a belt which is connected to a pulley on a separate encoder. A similar pulley system is shown in U.S. Pat. No. 5,530,455 assigned to Mouse Systems.

Yet another design is shown in U.S. Pat. No. 5,446,481 assigned to Mouse Systems. In this design, the roller has a shaft attached to a gear outside the roller, which drives an optical encoder wheel with the gear.

In addition to the rollers being turnable, a number of designs allow the roller itself to actuate a switch. In Microsoft U.S. Pat. No. 5,473,344, this is done with a roller which pivots inward under pressure from the finger, in addition to rolling about its axis. When pivoted inward, it will depress a microswitch to send an activation signal to the computer. Mouse Systems U.S. Pat. No. 5,530,455 shows a design in which the entire housing for the roller is depressed against supporting springs, and when depressed actuates an underlying microswitch.

U.S. Pat. No. 5,095,303 to Apple Computer shows a graphic controller with three dials, with at least one of the dials shown with an encoder ring and detectors, with the detectors being shown on either side of the dial in one drawing. However, unlike some of the designs discussed above, the dials are on a fixed axis and cannot be depressed to actuate a microswitch and provide another input signal.

A roller design having slots in the roller wheel itself is shown in Primax Electronics' U.S. Pat. No. 5,808,568. That patent also shows a support for the wheel which pivots with the wheel to depress a switch.

SUMMARY OF THE INVENTION

The present invention provides a simplified, inexpensive roller for a mouse, trackball or other input device. The support for the roller is attached to the bottom of a button.

In one embodiment, the roller is fixed with respect to the button so that when the roller is depressed, the button depresses to cause a switch activation. This is in contrast to prior art devices where the roller itself would depress into the housing. Here, the housing (button) depresses with the roller. This greatly simplifies the design.

In one embodiment, a wire spring has one end attached to the inside of the button, and the other end contacting an undulating surface on the inside of the roller. This provides a ratchet feel when a user rotates the roller. Preferably, the roller is supported by a simple pair of pegs on supports on the underside of the button. The pegs snap into cylindrical holes in the center of the roller around which the roller rotates.

In another aspect of the invention, the button is made of a single piece of plastic with the body of the housing. Although this has been done before, the design here provides a simple U-shaped loop which is simple to mold. The ability to depress the button is given by the hinge effect of the loop, with the amount and angle of button depression being controlled by a thinner portion of the loop. The loop can be sufficiently long to provide the appropriate hinge arm for the depression.

For a further understanding of the nature and advantages of the invention, reference should be made to the following description taken in conjunction with the accompanying drawings.

DESCRIPTION OF THE SPECIFIC EMBODIMENTS

Figure 1:
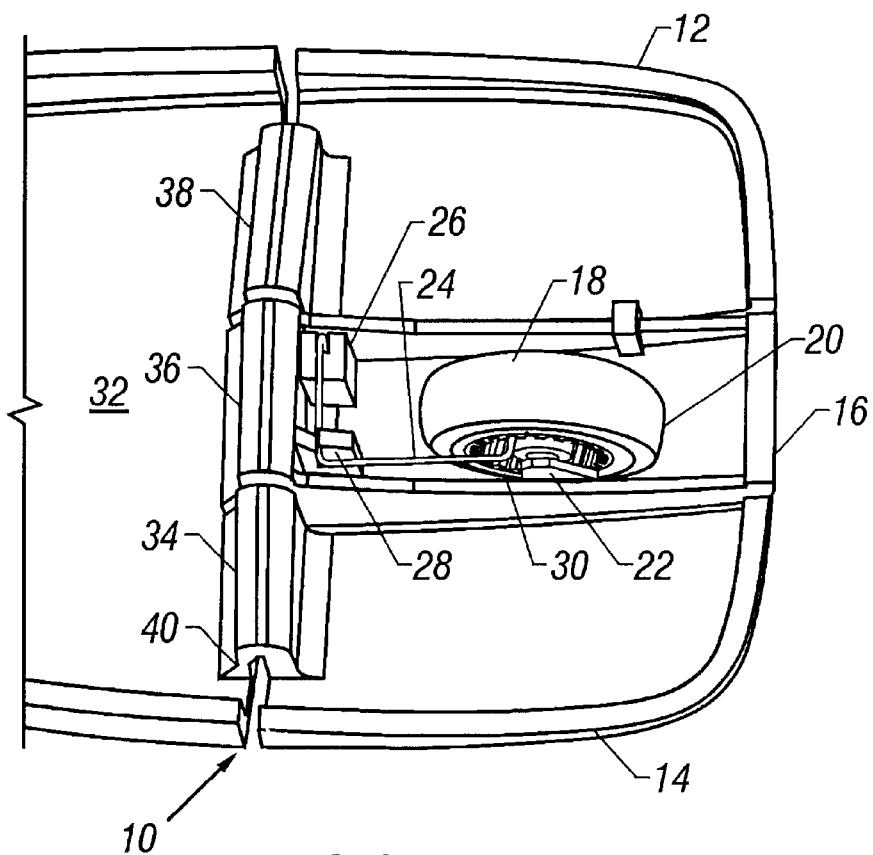
FIG. 1 is a perspective view of the underside of the button and roller of one embodiment of the invention.

FIG. 1 is a perspective view of the underside of the front portion of a mouse housing 10 having two buttons 12 and 14. Instead of having a non-button center piece between the two buttons, as in a typical prior art mouse, the present invention provides a third button 16. A roller 18 extends through a slot 20 in third button 16. The roller rotates about supports 22. A spring 24 is anchored by a first support 26 and a second support 28. The other end of spring 24 contacts an inside, undulating surface 30 of roller 18. The undulating surface can be formed as shown in prior Logitech application Ser.

No. 08/949,681, filed Oct. 14, 1997, entitled "Optical-Mechanical Roller with Ratchet."

FIG. 1 also shows all three buttons being connected to the body 32 of the mouse by U-shaped hinges 34, 36 and 38. Each hinge may have a weakened, or thinner portion such as portion 40 of hinge 34 which provides a location where bending will occur. The location and thickness of the weakened portion can be adapted so that the button has a desired amount of depression upon finger activation.

Figure 2:
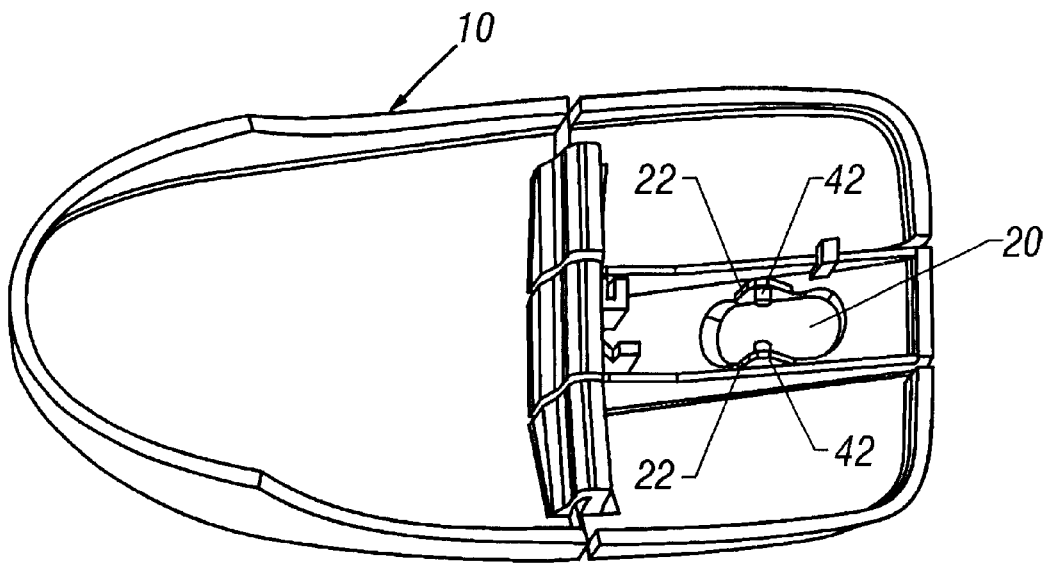
FIG. 2 is a perspective view of an embodiment of the underside of the top housing and buttons with the roller removed.

FIG. 2 shows the inside of the top housing 10 of the mouse of FIG. 1 without the roller and spring attached. Slot 20 is more visible in this picture. In addition, the two supports 22 can be seen. Each support 22 has a peg 42 extending inwardly to engage a cylindrical hole in the center of roller 18 as illustrated in FIG. 1.

Figure 3:
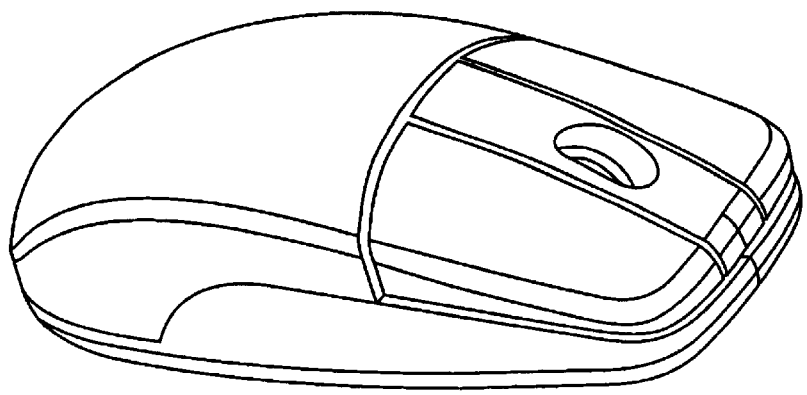
FIGS. 3–5 are views of the exterior of the housing, the inside of the bottom housing and the inside of the top housing, respectively, of the embodiment of FIG. 1.

FIG. 3 illustrates the exterior appearance of one embodiment of a mouse having a roller according to the present invention.

Figure 4:
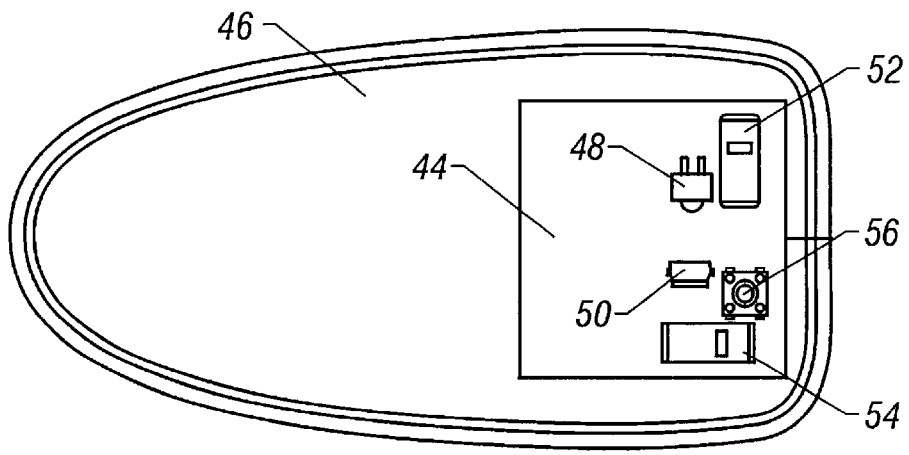
Figure 7:
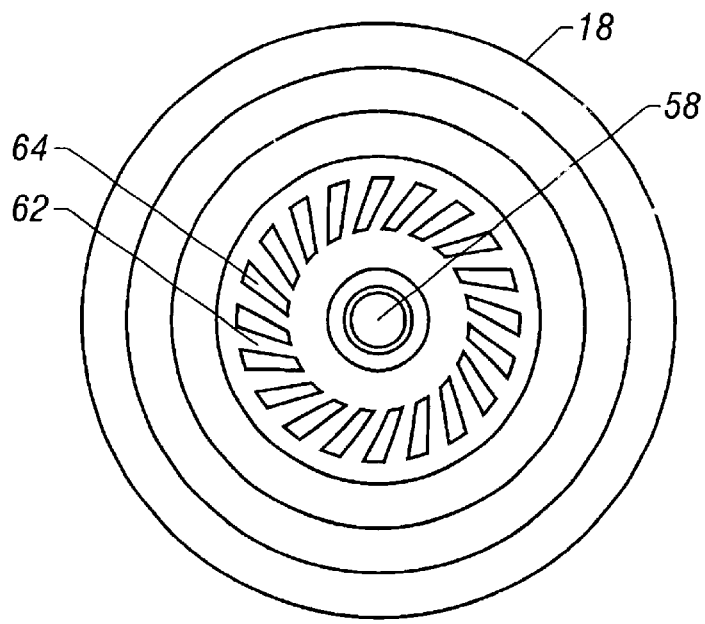
FIG. 7 is a view of an embodiment of the roller wheel.

FIG. 4 illustrates the layout of a printed circuit board (PCB) 44 mounted on a lower housing 46 of the mouse. On the printed circuit board is mounted a light emitter, such as a light emitting diode (LED) 48. LED 48 is on one side of the roller, while on the other side, opposite LED 48, is a photo detector 50. As the roller is rotated, the slots alternately block and let light pass from emitter 48 to detector 50. These slots in the roller can be seen in the view of FIG. 7.

Figure 5:
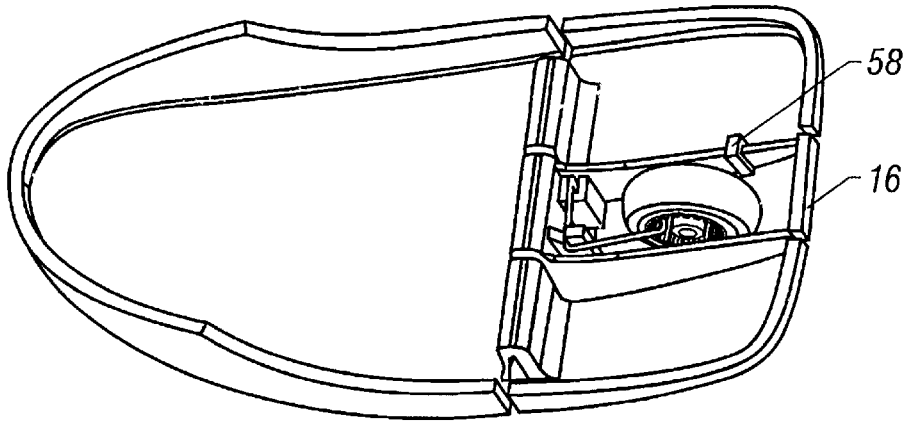

FIG. 4 also shows microswitches 52 and 54 which are placed beneath the two side buttons, 14 and 12 of FIG. 1. In addition, a third switch 56 is provided to be activated by third button 16. The switch is positioned so that it will be activated by a protrusion 58, visible in FIG. 5, on the bottom of third button 16. Switch 56 is a different type of switch from microswitches 52 and 54. Preferably, it is a pancake type of switch (also known as a tact switch or dome switch), which has a metal disk stamped into a dome shape. A pancake switch is used instead of the standard microswitches 52 and 54 because of its price and smaller size. Such a pancake switch, when force is applied, resists with the dome, then suddenly collapses, creating a tactile feedback.

Figure 6:
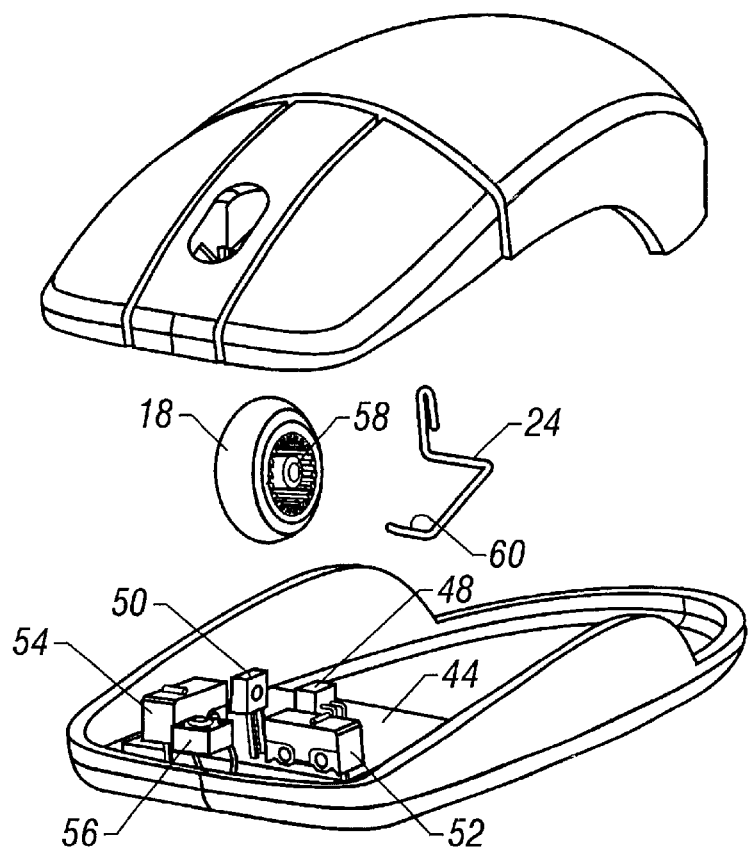
FIG. 6 is an exploded view of the housing and roller embodiment of FIG. 1.

FIG. 6 is an exploded view illustrating the disassembled roller 18 and spring 24, as well as the upper and lower housings. Also shown are the LEDs and switches on the circuit board 44. As can be seen, roller 18 has a central hub 58 with a cylindrical hollowed center for engaging pegs 42 of FIG. 2. The recessed interior allows an end 60 of spring 24 to engage the undulating inside surface. The opposite side from that shown in 58 is a series of slots on a flat side of the roller which holds the hub 58. This can be seen more clearly in FIG. 7, which shows the other end of hub 58 connected to the outside of the roller by a series of spoke-like members 62 which define inbetween them slots 64. As mentioned above, as the roller is rotated by the user, the slots alternately allow light to pass between being blocked by spokes 62. The slots shown in this embodiment are not radial. The angle is such that the slot positioned on the optical axis between the LED and the sensor is vertical, when the LED and sensor are mounted off to the side of the midpoint of the roller. Alternately, the LED and detector could be mounted at the midpoint, with the slots slightly angled to correspond to the angle at which the roller and button are depressed, so that the slot will stay in the middle of the LED and detector as the roller and button are depressed. In another embodiment, the LED and detector could be mounted to the side of the roller midpoint, with the angle of the slots compensating for both the position of the LED and detector, and for the lateral movement upon depression of the roller and button.

The U-shaped hinges 34, 36 and 38 illustrated in FIG. 1 allow a single piece of plastic to form the housing and keys. Although buttons formed of the same plastic as the housing has been done before, typically it has required a bridge between the key and the housing which requires an insert for the plastic mold. The present invention connects the key to the housing with a simple U-shaped connection, which allows it to be molded without an insert, simply using a slot to form the U. The U has a thinner, weakened portion where the bending will occur when the key is depressed. The longer the thin portion of the U can be made, the less bending is required at the weakened point, lessening the likelihood of breakage and resulting in a longer life for the hinge.

Preferably, the altitude of the thin portion, or flexing zone, of the U-shaped connection above the PCB is approximately the same as the altitude of the axis of the roller. This results in less lateral movement of the button as it is depressed, so that the roller will move up and down approximately vertically. This prevents the slots on the roller wheel from moving substantially sideways as the button is depressed, causing an artifact signal. Thus, the slots can be radial, allowing a simpler design.

As will be apparent to those skilled in the art, the present invention may be embodied in other specific forms without departing from the essential characteristics thereof. For example, the button could be on a track ball, joy stick, game pad or other device, not just a mouse. The light emitter detector could be attached to the bottom of the button, rather than being on a circuit board on the bottom housing. The roller could be attached by a different mechanism, such as by the roller having protruding pegs which engage holes inside supports. The light emitter and detector could be on the same side of the roller, with the roller having an alternately reflective and absorptive surface. Alternately, a magnetic or other type of non-optical encoder could be used. Accordingly, the foregoing description is intended to be illustrative, but not limiting, of the scope of the invention which is set forth in the following claims.

What is claimed is:

1. A computer input device comprising:
   a housing;
   a button mounted on said housing, said button having a slot;
   a switch mounted below said button so that said switch can be activated by depressing said button;
   a roller extending partially through said slot in said button; and
   a support for said roller mounted on an inside surface of said button, so that said support and said roller move with said button.

2. The device of claim 1 further comprising:
   a circuit board mounted inside said housing beneath said button;
   a light emitter mounted on said circuit board on a first side of said roller;
   a light detector mounted on said circuit board on a second side of said roller; and
   said roller having a plurality of slots for allowing light from said light emitter to pass through to said light detector.

3. The device of claim 1 further comprising:
   a ratcheting mechanism connected to said roller for resisting movement of said roller to provide a ratcheting feel to a user.

4. The device of claim 3 wherein said ratcheting mechanism comprises:

an undulating surface on an inside of said roller; and a spring having a first end attached to said inside surface of said button, and a second end biased against said undulating surface.

5. The device of claim 1 wherein said support for said roller comprises a pair of members integrally formed with said button, each of said members having a peg for engaging a hole in the center of said roller so that said roller can rotate around said pegs.

6. The device of claim 1 wherein said button is connected to a body of said device by being formed from an integral piece of plastic, said plastic forming a U-shape between said body and said button, said U-shape having sufficient size to allow said button to be depressed with respect to said body, said U-shape forming a hinge.

7. The device of claim 6 wherein said U-shape includes a weakened portion to cause bending to occur at said weakened portion, giving a desired flex point.

8. A computer input device comprising:

a housing body;

a button mounted on said housing, said button being connected to said housing body of said device by being formed from an integral piece of plastic, said plastic forming a U-shape between said body and said button, said U-shape having sufficient size to allow said button to be depressed with respect to said body, said U-shape forming a hinge between the body and the button; and a switch mounted below said button so that said switch can be activated by depressing said button.

9. The device of claim 8 wherein said U-shape includes a weakened portion to cause bending to occur at said weakened portion, giving a desired flex point.

10. A computer input device comprising:

a housing including a base and a button which has a slot and is movable relative to the base;

a switch disposed on the base and being activatible by pushing the button against the switch; and a roller having a portion exposed through the slot of the button, the roller being mounted to the button to move with the button relative to the base.

11. The computer input device of claim 10 further comprising a roller support which mounts the roller to the button.

12. The computer input device of claim 11 wherein the roller support is connected to an inside surface of the button and comprises at least one peg extending into a hole in a center of the roller to rotatably support the roller with respect to the button.

13. The computer input device of claim 12 wherein the roller support comprises two pegs engaging the hole in the center of the roller from opposite sides of the hole.

14. The computer input device of claim 10 further comprising:

a light emitter disposed on the base on a first side of the roller; and a light detector disposed on the base on a second side of the roller opposite from the first side of the roller, wherein the roller includes a plurality of slots which allow light from the light emitter to pass through to the light detector.

15. The computer input device of claim 14 further comprising a circuit board disposed on the base, wherein the light emitter and the light detector are mounted on the circuit board.

16. The computer input device of claim 10 further comprising a ratcheting mechanism connected to the roller for providing resistance to movement of the roller to provide a ratcheting feel to a user.

17. The computer input device of claim 16 wherein the ratcheting mechanism comprises:

an undulating surface on an inside of the roller; and a spring having a first end attached to the inside surface of the button and a second end biased against the undulating surface.

18. The computer input device of claim 10 wherein the housing includes a hinge support for the button to allow the button to move relative to the base.

19. The computer input device of claim 18 wherein the hinge support comprises a U-shaped member which is integrally formed with the housing and the button from an integral piece, the U-shaped member having a sufficient size to allow the button to be depressed with respect to the base.

20. The computer input device of claim 19 wherein the U-shaped member includes a weakened portion to permit bending to occur at the weakened portion upon depressing the button with respect to the base.

* * * * *